United States Patent [19]

Okada et al.

[11] Patent Number: 4,954,901

[45] Date of Patent: Sep. 4, 1990

[54] TELEVISION RECEIVER WITH TWO ELECTRON BEAMS SIMULTANEOUSLY SCANNING ALONG RESPECTIVE VERTICALY SPACED APART LINES

[75] Inventors: Takashi Okada, Kanagawa; Atsushi Matsuzaki, Yokohama, both of Japan

[73] Assignee: Sony Corporation, Tokyo, Japan

[21] Appl. No.: 579,561

[22] Filed: Feb. 13, 1984

[30] Foreign Application Priority Data

Feb. 15, 1983 [JP] Japan .................................. 58-23168
Feb. 16, 1983 [JP] Japan .................................. 58-23998

[51] Int. Cl.$^5$ ......................... H04N 5/68; H04N 9/20
[52] U.S. Cl. .................................. 358/242; 315/13.1; 358/65; 358/140
[58] Field of Search .................. 358/64, 65, 242, 140; 313/409, 413; 315/13.1

[56] References Cited

U.S. PATENT DOCUMENTS

| | | | |
|---|---|---|---|
| 2,855,542 | 10/1958 | Schade | 315/13.1 |
| 3,363,129 | 1/1968 | De France et al. | 358/65 |
| 3,411,029 | 11/1968 | Karr | 313/409 |
| 3,513,350 | 5/1970 | Ohgoshi et al. | 315/13.1 |
| 4,400,722 | 8/1983 | Miyatake et al. | 358/60 |
| 4,415,931 | 11/1983 | Dischert | 358/242 |
| 4,521,802 | 6/1985 | Ikeda | 358/140 |
| 4,604,547 | 8/1986 | Saito et al. | 313/413 |
| 4,668,977 | 5/1987 | Ohno et al. | 358/60 |

FOREIGN PATENT DOCUMENTS

| | | |
|---|---|---|
| 145428 | 11/1979 | Japan .................................. 358/21 V |
| 27755 | 2/1980 | Japan .................................. 315/13.1 |
| 206034 | 12/1983 | Japan . |
| 223992 | 12/1983 | Japan . |
| 1064346 | 12/1983 | U.S.S.R. . |
| 1424031 | 2/1976 | United Kingdom . |

OTHER PUBLICATIONS

Liff, Alvin A., *Color and Black & White Television Theory and Servicing*, Second Edition, Prentice-Hall, date unknown, p. 40.

*Primary Examiner*—James J. Groody
*Attorney, Agent, or Firm*—Alvin Sinderbrand

[57] ABSTRACT

A television receiver for providing a non-interlaced display of a received television signal intended for interlaced display includes a cathode ray tube having first and second cathodes, control grids and a fluorescent screen, a circuit for applying a first video signal to the first cathode such that the first cathode emanates a first electron beam in response to the first video signal, a circuit for applying a second video signal to the second cathode such that the second cathode emanates a second electron beam in response to the second video signal, a deflection device for horizontally and vertically deflecting the first and second electron beams from the first and second cathodes simultaneously and a deflection compensating device provided between the first and second cathodes and the fluorescent screen for making the second electron beam impinge upon the fluorescent screen between the lines scanned by the first electron beam such that the second electron beam forms a visual display with lines ½ line interval apart, in the vertical direction, from a visual display formed by the first electron beam. The first and second video signals fed to the first and second cathodes are the same in one embodiment. In other embodiments, the video signals fed to the two cathodes in one line may be the video signal for that one line and the average of the video signal for that one line and the video signal for the preceding or succeeding line, respectively.

10 Claims, No Drawings

TELEVISION RECEIVER WITH TWO ELECTRON BEAMS SIMULTANEOUSLY SCANNING ALONG RESPECTIVE VERTICALY SPACED APART LINES

BACKGROUND OF THE INVENTION

1. Field of the Invention

The present invention relates generally to television receivers and more particularly to a television receiver suitable for use in a video signal display apparatus having a large display area such as a video projector and the like.

2. Description of the Prior Art

Recently, in a video signal display apparatus having a large display area such as a video projector and the like, its resolution has been increased significantly by improvements of a television receiver (cathode ray rube and electric circuit) and lenses which construct such display apparatus. However, as the resolution is increased, the scanning lines which, up to that time, were inconspicuous become visible or conspicuous, thus making it difficult to improve picture quality.

In the visual display according to the interlaced system, in the NTSC system employing 525 scanning lines per frame, 262.5 lines constitute one field, that is, there are an odd and an even field in each frame, and the fields occur at the frequency of 60 Hz to suppress a field flicker. On the other hand, in order to obtain a desired vertical resolution, as shown in FIG. 1, during each field next to, or immediately following or preceding a certain field, an electron beam scans a scanning line which is spaced ½ line interval apart from the corresponding scanning line in the preceding field to provide an interlaced display. In FIG. 1, references lo and le respectively designate scanning lines of odd and even fields, while references Bmo and Bme respectively designate positions of electron beams for odd and even fields in the case of an interlaced display.

In this case, although macroscopically the number of picture images is 60 pictures/second, microscopically light is emitted from each scanning line at every 1/30 second so that its display period is 1/30 second. For example, noting a point P in FIG. 1, the brightness of the point P becomes high at every 1/30 second as shown in FIG. 2. As a result, the visual display of each scanning line is perceived as a flicker in the visual sense.

As a method effective for removing the flicker, it has been proposed to form the electron beam Bmo (Bme) so that its landing spot is elongated such that it lies across both a scanning line lo of, for example, an odd field and an adjacent scanning line le of the even field. In FIG. 3, when considering the point P in the same way as in FIG. 1, the brightness of the point P becomes high at every 1/60 second as shown in FIG. 4. Consequently, if the electron beam Bmo (Bme) is formed so as to have an elongated landing spot, the respective scanning lines lo and le emanate light at every 1/60 second and hence the flicker is much less perceived.

It is, however, impossible to elongate the electron beam Bmo (Bme) landing spot in the vertical direction and to scan the whole of the fluorescent screen. Particularly in the four corners of the fluorescent screen, as shown in FIG. 5, the electron beam Bmo, for example, is distorted and its landing spot becomes longer slantwise so that the signals are overlapped in the horizontal direction to thereby cause the horizontal resolution to be deteriorated. Moreover, when the electron beam Bmo (Bme) is formed longer longitudinally, as shown by a broken line in FIG. 6, the inclination TR of the brightness cross-section of the electron beam loses steepness to affect not only an N scanning line but also an (N+1) scanning line of, for example, the same field and thus the vertical resolution is deteriorated. A solid line in FIG. 6 shows a brightness cross-section of an electron beam with an ordinary shape.

OBJECTS AND SUMMARY OF THE INVENTION

It is an object of the present invention to provide an improved television receiver.

It is another object of the present invention to provide a television receiver free from the deterioration of resolution and which can prevent a flicker of a scanning line from being perceived.

It is a further object of the present invention to provide a television receiver capable of alleviating a step-like distortion, namely, so-called "zig-zag" display formed on a slant line portion in an animation.

It is a still further object of the present invention to provide a television receiver suitable for being adapted to a television receiver which is included in a video signal display apparatus of large display area such as a projector and the like.

According to a first embodiment of the present invention, to attain the above objects in a television receiver operable by a television signal intended for interlaced display, first and second electron beams are emitted emanated from first and second cathodes which are driven by the same video signal and are deflected by a deflection compensating magnetic field or a deflection compensating electric field to impinge upon a fluorescent screen such that the first and second electron beams simultaneously scan the fluorescent screen with approximately ½ line interval in the vertical direction between the points where the beams impinge on the screen.

In the first embodiment of the present invention constructed as described above the second electron beam scans a scanning line in each field which, in the case of interlaced display, would emit light in the succeeding field thereby to cause light emission from all of the scanning lines during each field. Accordingly, the display period of each scanning line becomes, for example, 1/60 second and thus the flicker of the scanning line is much less perceived on the picture image to be displayed. In addition, according to the present invention, since the electron beam is not formed longer longitudinally, the resolution is not deteriorated.

According to a second embodiment of the present invention, when one of the cathodes is supplied with a signal for one line, the other cathode is supplied with a signal which is formed by averaging the instantaneous value of that one line signal and the instantaneous value of the signal for the corresponding position along the preceding or succeeding line.

In such second embodiment of the present invention, since the other cathode is supplied with the signal which is formed by averaging the one line signal and the preceding or succeeding line signal, on a slant line portion of an animation, the changes of visual display from the first field to the second field are not so well perceived and thus so-called "zig-zag" display can be alleviated.

The above and other objects, features and advantages of the present invention, will become apparent from the following description taken in conjunction with the accompanying drawings through which the like references designate the same elements and parts.

BRIEF DESCRIPTION OF THE DRAWINGS

FIGS. 8 to 15, 16A to 16F, 17A to 17F and 18 are respectively diagrams useful for explaining the cathode ray tube used in the embodiment in FIG. 7;

DESCRIPTION OF THE PREFERRED EMBODIMENTS

A first embodiment of a television receiver according to the present invention which is of a video projector type will hereinafter be described with reference to FIG. 7. It will be appreciated that such television receiver is operable by a standard television signal, for example, an NTSC signal, intended for interlaced display.

Figure 7:
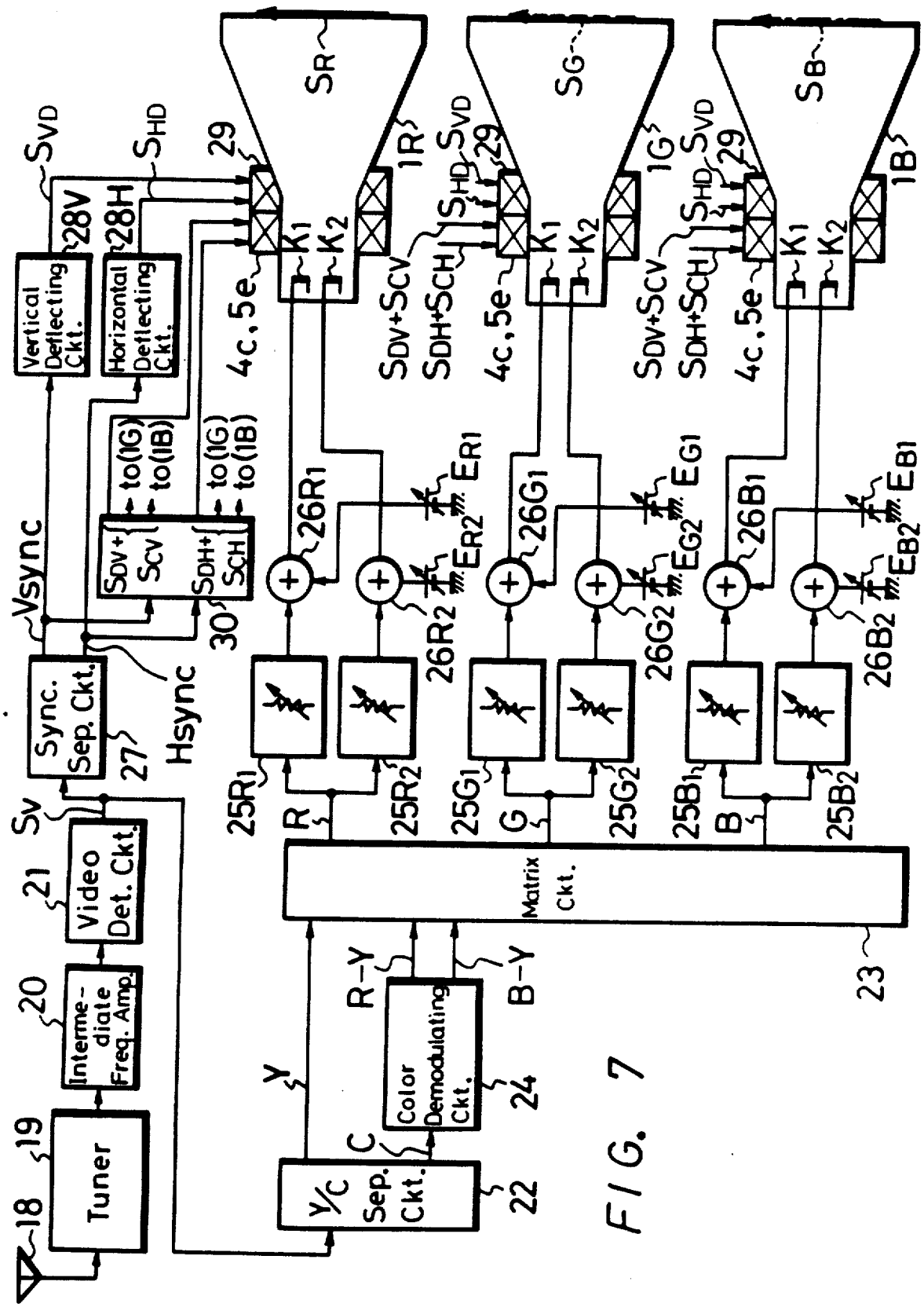
FIG. 7 is a schematic diagram showing an embodiment of the television receiver according to the present invention.

In FIG. 7, reference numerals 1R, 1G and 1B designate cathode ray tubes of a video projector type by which red, green and blue picture images $S_R$, $S_G$ and $S_B$ are formed, respectively. Though not shown, the red, green and blue picture images $S_R$, $S_G$ and $S_B$ formed on the respective fluorescent screens of the cathode ray tubes are respectively projected through projection lenses to a screen so as to be superimposed on one another so that a color image is displayed on this screen.

Figure 8:
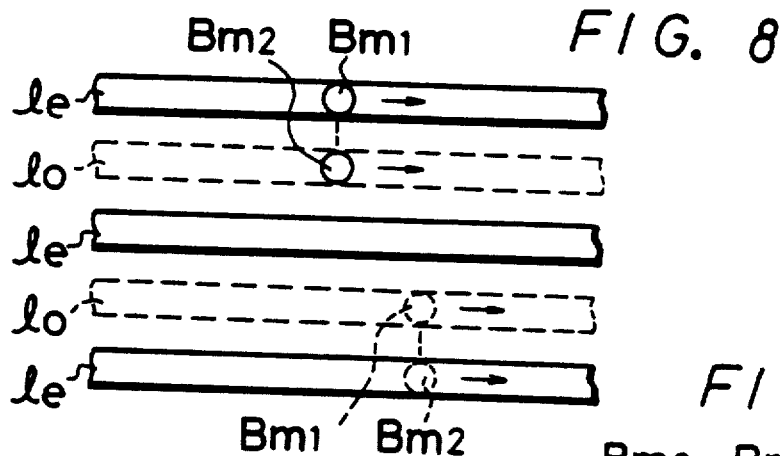
Figure 9:
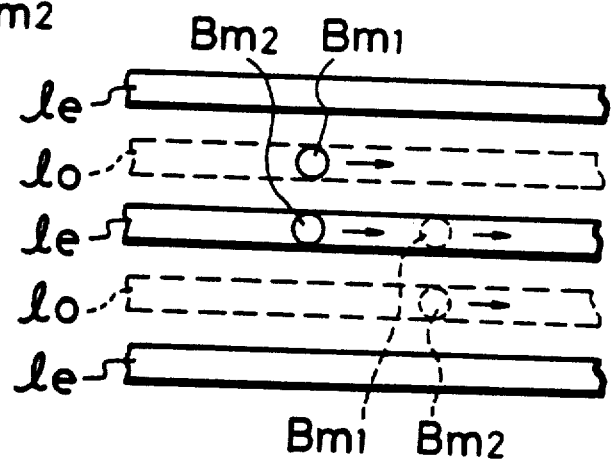

Each of the cathode ray tubes 1R, 1G and 1B is formed as a 2-beam system. That is, in each of the cathode ray tubes, first and second cathodes K1 and K2 relating to first and second electron beams Bm1 and Bm2 are disposed in parallel to each other, and the first and second electron beams Bm1 and Bm2 emanated from the first and second cathodes K1 and K2 simultaneously scan the fluorescent screen along lines spaced apart from each other in the vertical direction with a $\frac{1}{2}$ line interval therebetween. By way of example, as shown in FIG. 8, in each even field, as shown by solid line circles in the figure, the first and second electron beams Bm1 and Bm2 respectively scan the inherent or usual even scanning lines le and odd scanning lines lo, that is, lines that would normally be scanned only in each odd field in the case of an interlaced display, while in the odd field, as shown by broken line circles in the figure, the first and second electron beams Bm1 and Bm2 scan the scanning lines lo and le, respectively. Moreover, as, for example, shown in FIG. 9, in the even field, as shown by solid line circles in the figure, the first and second electron beams Bm1 and Bm2 may respectively scan the scanning lines lo and le, while in the odd field, as shown by broken line circles in the figure, the first and second electron beams Bm1 and Bm2 respectively scan the scanning lines le and lo, respectively.

Thus, it will be appreciated that the television receiver according to the present invention provides a non-interlaced display of a received television signal intended for interlaced display.

Figure 2:
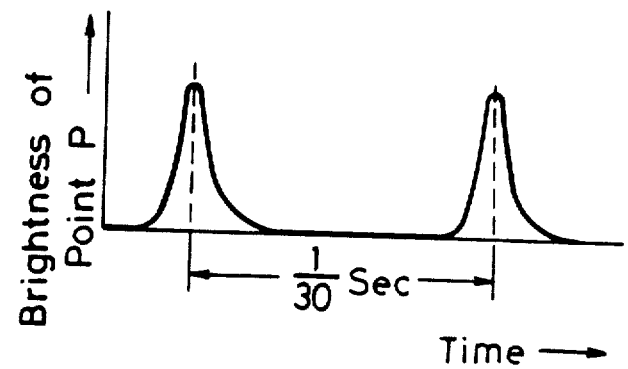
Figure 3:
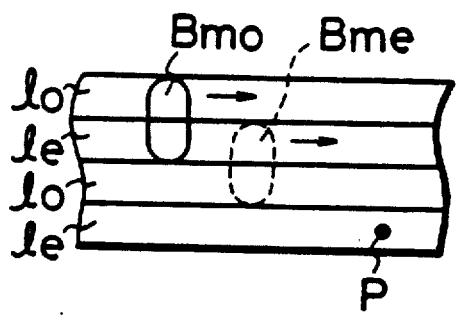
Figure 4:
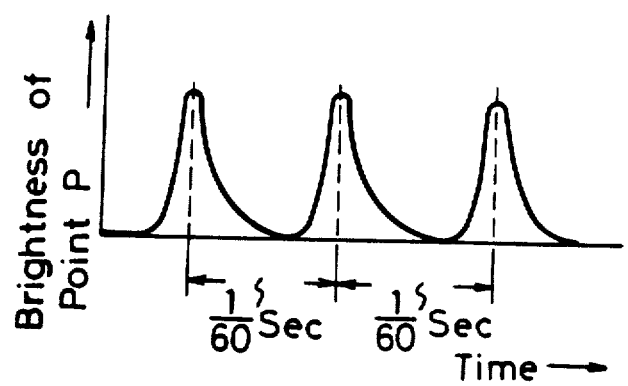
Figure 5:
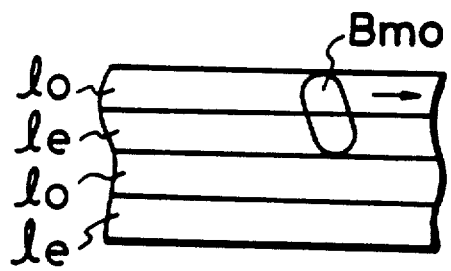
Figure 6:
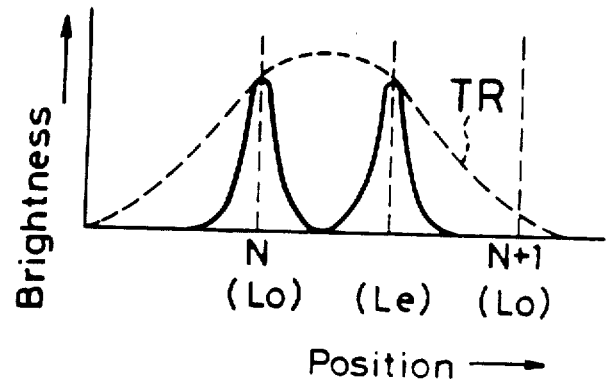
Figure 10:
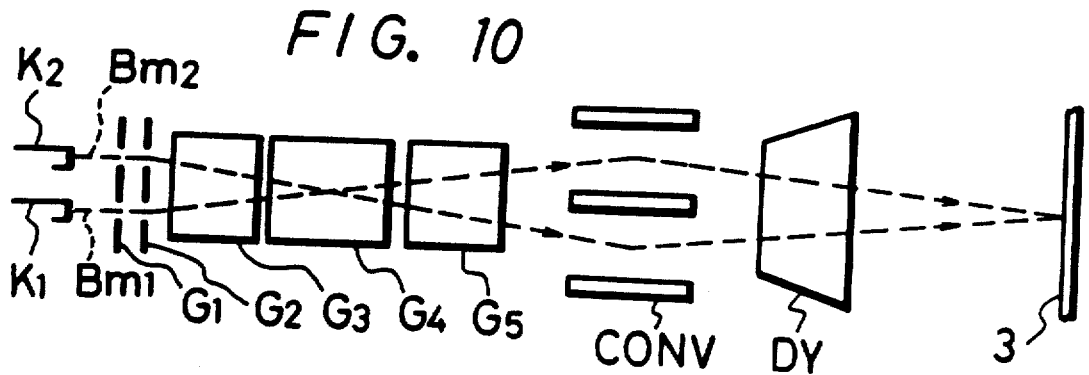
Figure 11:
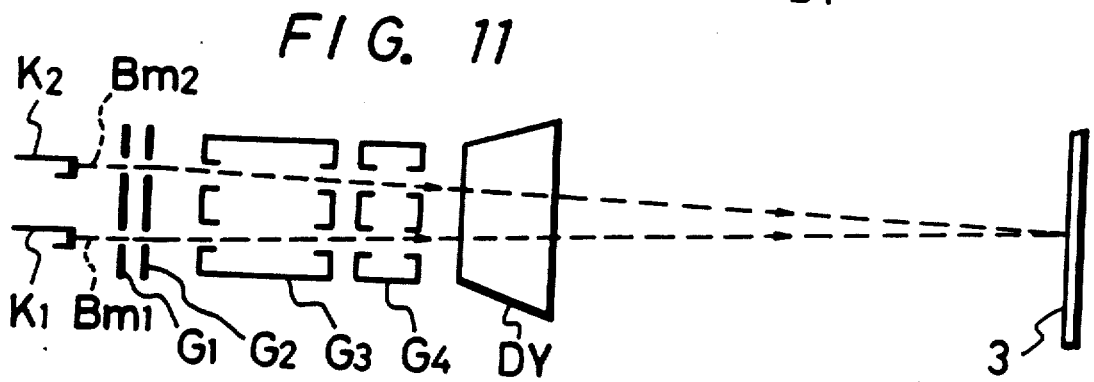

Each of the cathode ray tubes 1R, 1G and 1B may be of the TRINITRON (registered trade mark) type shown in FIG. 10 or 2-electron gun type as, for example, shown in FIG. 11. At any rate, each of the cathode ray tubes includes the first and second cathodes K1 and K2 relating to the first and second electron beams Bm1 and Bm2. In FIG. 10, references $G_1$ to $G_5$ respectively designate control grids, CONV a convergence electrode (electrostatic deflection plate) and DY a deflection yoke, while in FIG. 11, references $G_1$ to $G_4$ respectively designate control grids and DY a deflection yoke. In addition, in FIGS. 10 and 11, reference numeral 3 designates a phosphor or fluorescent screen.

In order that the first and second electron beams Bm1 and Bm2 may impinge upon the fluorescent screen 3 with a distance apart from each other in the vertical direction of about $\frac{1}{2}$ line interval, a predetermined magnetic field is applied from the outside to the passages of the first and second electron beams Bm1 and Bm2.

Figure 12:
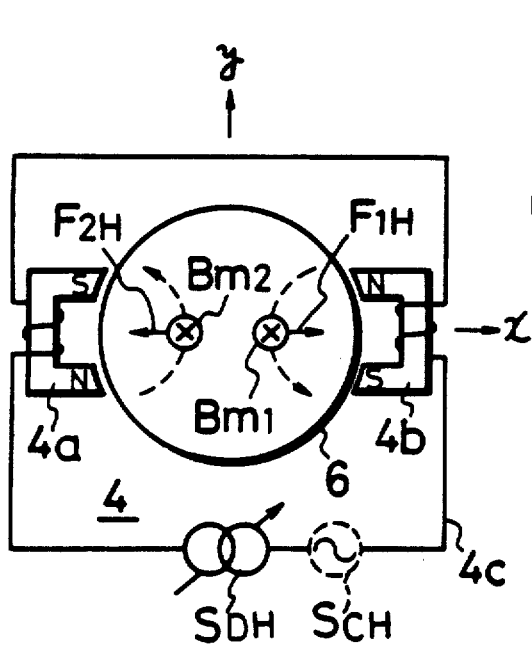
Figure 13:
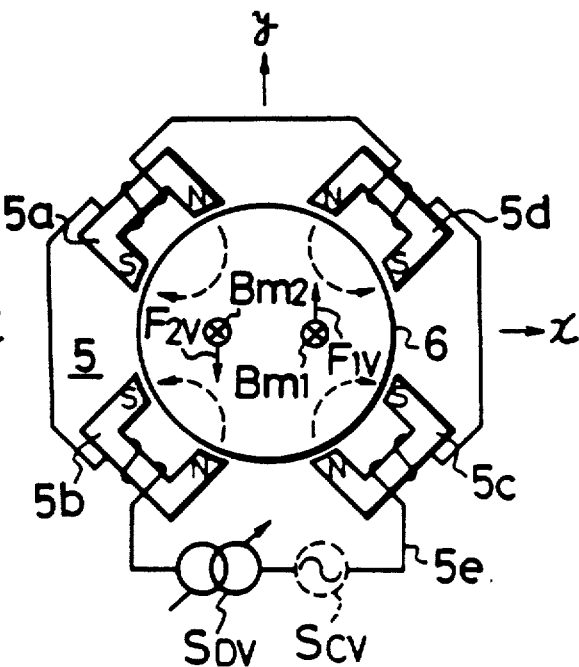

Now, let it be considered that the first and second cathodes K1 and K2 are disposed in parallel to each other in the horizontal direction. In this case, a horizontal convergence yoke 4 and a vertical convergence yoke 5 are disposed as, for example, shown in FIGS. 12 and 13, in a plane perpendicular to the tube axis at a location along such axis closer to the cathode than to the deflection yoke DY, and provided that, at such location, the first and second electron beams Bm1 and Bm2 are spaced apart from each other. In other words, the center of the grid $G_4$ in FIG. 10 is not a permissible location for yokes 4 and 5. In FIGS. 12 and 13, reference numeral 6 designates the neck portion, x the horizontal direction and y the vertical direction, respectively. The horizontal convergence yoke 4 shown in FIG. 12 is formed of a pair of cores 4a and 4b which are disposed across, for example, the neck portion 6 in the horizontal direction x, and around which a coil 4c is wound in a predetermined direction. A D.C. current $S_{DH}$ of a predetermined magnitude is made to flow in the coil 4c so that predetermined magnetic poles are produced at the tip pieces of the cores 4a and 4b, respectively. If the magnetic poles generated at the tip pieces of the cores 4a and 4b are as shown in FIG. 12, magnetic fields shown by broken lines are generated. Accordingly, if the first and second electron beams Bm1 and Bm2 are oriented in the direction perpendicular to the sheet of the drawing as shown by marks ⊗, these first and second electron beams Bm1 and Bm2 are given forces F1H and F2H which are opposite to each other in the horizontal direction. In this case, when the magnitude of the magnetic field is controlled, namely, the magnitude of the D.C. current $S_{DH}$ is controlled, the forces F1H and F2H are changed. When the magnetic poles which are generated at the tip pieces of the cores 4a and 4b are oriented in the direction opposite to those in the figure, the forces F1H and F2H are oriented in the directions opposite to those in the figure. Consequently, when the D.C. current $S_{DH}$ is changed, the first and second electron beams Bm1 and Bm2, for example, can be made to impinge at the same position at, for example, the center of the phosphor screen 3 in the horizontal direction.

On the other hand, the vertical convergence yoke 5 shown in FIG. 13 is formed of cores 5a, 5b, 5c and 5d which are disposed around, for example, the neck portion 6 with an angular spacing of 90° between adjacent ones in the horizontal and vertical directions x and y, and around which a coil 5e is wound in a predetermined direction. Then, a D.C. current $S_{DV}$ of a predetermined magnitude is made to flow in the coil 5e so that predetermined magnetic poles are generated in the tip pieces of the cores 5a, 5b, 5c and 5d. If the magnetic poles generated at the cores 5a, 5b, 5c and 5d are as shown in FIG. 13, magnetic fields shown by broken lines in the figure are generated. Accordingly, if the first and second electron beams Bm1 and Bm2 are oriented in the direction perpendicular to the sheet of the drawing as shown by marks ⊗, these first and second electron beams Bm1 and Bm2 are given forces F1V and F2V which are opposite to each other in the vertical direction y. In this case, when the magnitude of the magnetic field is controlled, namely, the magnitude of the D.C. current $S_{DV}$ is controlled, the forces F1V and F2V are changed. If the magnetic poles generated at the tip pieces of the cores 5a, 5b, 5c and 5d are oriented in the directions opposite to those in the figure, the directions of the forces F1V and F2V become opposite to those in the figure. Consequently, when the D.C. current $S_{DV}$ is changed, the first and second electron beams Bm1 and Bm2, for example, can impinge upon the fluorescent screen 3 at its center with approximately ½ line interval apart from each other in the vertical direction.

When the first and second cathodes K1 and K2 are disposed in parallel to each other in the vertical direction, the convergence yoke 4 shown in FIG. 12 is rotated 90° and used as the vertical convergence yoke, while the convergence yoke 5 shown in FIG. 13 is used as the horizontal convergence yoke as it is.

Figure 14:
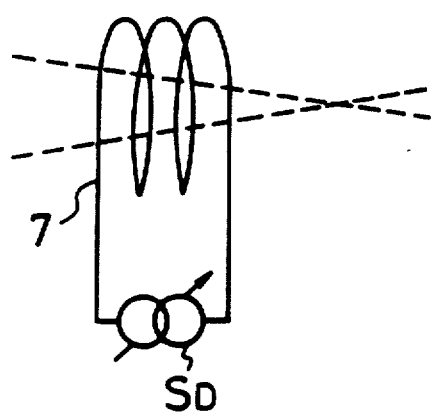
Figure 15:
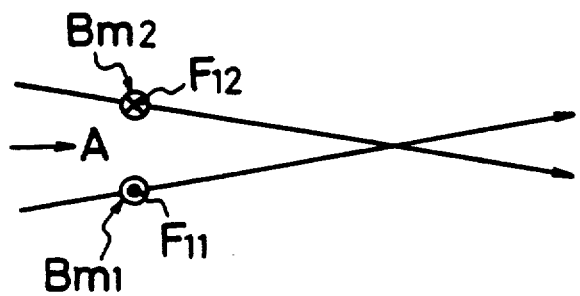

Further, it is possible that as shown in FIG. 14, a so-called twist coil 7 is wound around a neck portion (not shown) and the D.C. current $S_D$ is made to flow therethrough to generate the magnetic field in the tube axis direction. Accordingly, as shown in FIG. 15, if the direction of the magnetic field generated by the twist coil 7 is taken as A, the first electron beam Bm1 is acted upon by a force F11 which comes toward the viewer of the drawing in the direction perpendicular to the sheet of the drawing as shown by mark ⊙, while the second electron beam Bm2 is acted upon by a force F12 which goes away from the viewer or into the sheet of the drawing in the direction perpendicular to the sheet of drawing as shown by ⊗. Therefore, in the cathode ray tube in which the first and second cathodes K1 and K2 are disposed in parallel to each other in the horizontal direction, this twist coil 7 can be used instead of the vertical convergence yoke 5, while in the cathode ray tube in which the first and second cathodes K1 and K2 are disposed in parallel to each other in the vertical direction, this twist coil 7 can be used instead of the horizontal convergence yoke 4.

Depending on the accuracy achieved in assembling the deflection yoke DY and the electron gun, it is generally the case that each of the cathode ray tubes has its peculiar mis-convergence. Accordingly, as shown by broken lines in FIGS. 12 and 13, together with the D.C. currents $S_{DH}$ and $S_{DV}$, compensating signals $S_{CH}$ and $S_{CV}$ flow in the coils 4c and 5e. As a result, the first and second electron beams Bm1 and Bm2 are compensated for so that, over the entire area of the fluorescent screen 3, the first and second electron beams Bm1 and Bm2 impinge on the fluorescent screen 3 at the same position relative to the horizontal direction x, while the first and second electron beams Bm1 and Bm2 impinge thereon with approximately ½ line interval apart from each other in the vertical direction y.

The compensating signals $S_{CH}$ and $S_{CV}$ are made different depending on the modes of mis-convergence.

Figure 16A:
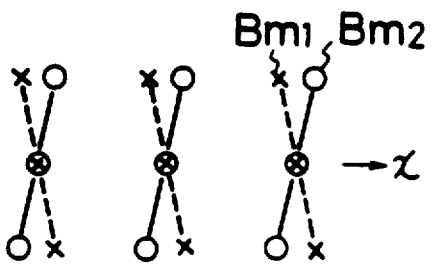
Figure 16B:
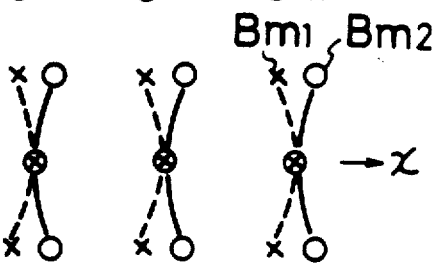
Figure 16C:
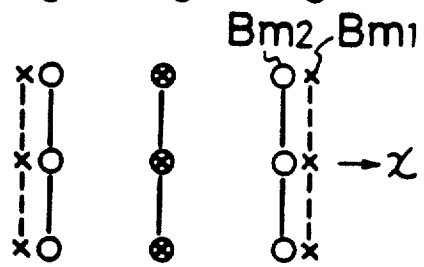
Figure 16D:
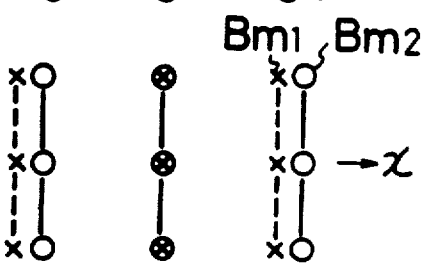
Figure 16E:
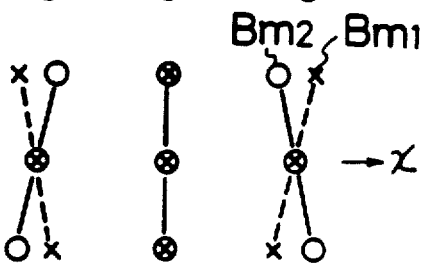
Figure 16F:
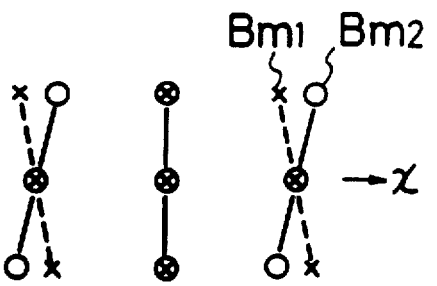

When a horizontal mis-convergence as, for example, shown in FIG. 16A is caused, a sawtooth waveform current having a cycle of one vertical period (1V) as shown in FIG. 17A is supplied as the compensating signal $S_{CH}$. In FIGS. 16A to 16F, marks X and O respectively represent the first and second electron beams Bm1 and Bm2. As described above, the first and second electron beams Bm1 and Bm2 impinge upon the fluorescent screen 3 at the same position relative to the horizontal direction x, and approximately ½ line interval apart from each other relative to the vertical direction y. However, in FIGS. 16A to 16F, for convenience of description, it is assumed that the first and second electron beams Bm1 and Bm2 impinge upon the fluorescent screen 3 at the same position in the horizontal and vertical directions. When a horizontal mis-convergence as shown in FIG. 16B is caused, a parabolic waveform current having a cycle of 1V as shown in FIG. 17B is supplied as the compensating signal $S_{CH}$. When a horizontal mis-convergence as shown in FIG. 16C is caused, a sawtooth waveform current having a cycle of one horizontal period (1H) as shown in FIG. 17C is supplied as the compensating signal $S_{CH}$. When a horizontal mis-convergence as shown in FIG. 16D is caused, a parabolic waveform current having a period of 1H as shown in FIG. 17D is supplied as the compensating signal $S_{CH}$. When a horizontal mis-convergence as shown in FIG. 16E is caused, a current whose waveform is formed by multiplying the sawtooth waveform of the cycle of 1V with the sawtooth waveform of the cycle of 1H as shown in FIG. 17E is produced and then supplied as the compensating signal $S_{CH}$. When a horizontal mis-convergence as shown in FIG. 16F is caused, a current whose waveform is formed by integrating the waveform shown in FIG. 17E is produced as shown in FIG. 17F and then supplied as the compensating signal $S_{CH}$. These examples are typical ones, and in practice, the currents of the waveform in the respective cases are combined and then used as the compensating signal $S_{CH}$.

While the compensating signal $S_{CH}$ is described above, the compensating signal $S_{CV}$ can be considered in the same manner.

Figure 18:
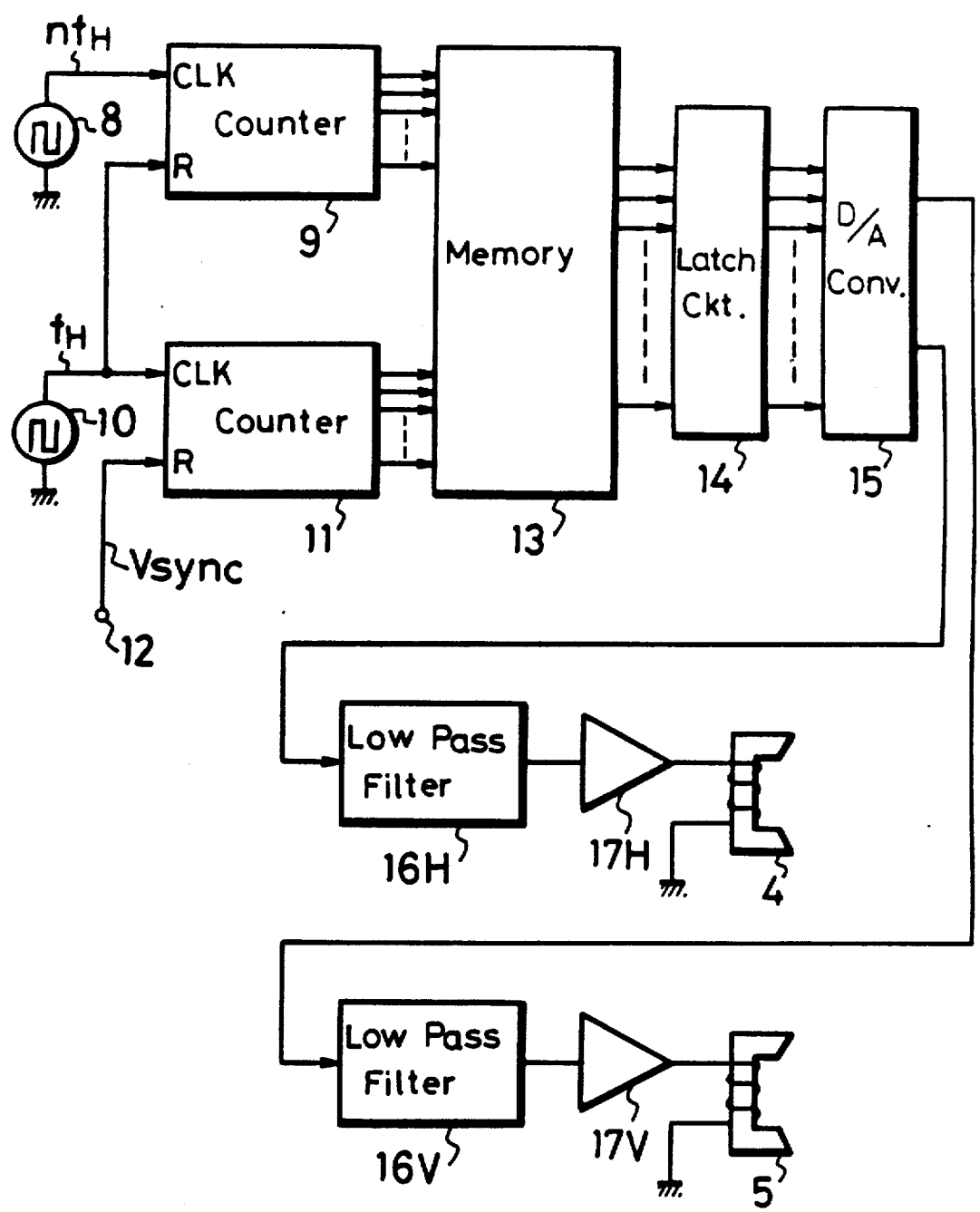

Moreover, it is possible that, for example, as shown in FIG. 18, the compensating signals $S_{CH}$ and $S_{CV}$ for respective portions of the fluorescent screen are written in advance in the memory, the written compensating signals $S_{CH}$ and $S_{CV}$ are read out in turn from the memory in response to the scanning positions of the first and second electron beams Bm1 and Bm2 and, then delivered.

In FIG. 18, reference numeral 8 designates a signal generator which generates a signal with a frequency $nf_H$ (n represents an integer, for example, from 5 to 50 and $f_H$ a horizontal frequency). The signal with the frequency $nf_H$ is supplied to a counter 9 which forms a read address signal. Reference numeral 10 designates a signal generator which generates a signal with a frequency $f_H$. The signal with the frequency $f_H$ is supplied to a counter 11 which generates a read address signal and also to the counter 9 as its reset signal. From a terminal 12 is supplied a vertical synchronizing signal $V_{sync}$ to the counter 11 as its reset signal. From the counters 9 and 11 are derived read address signals corresponding to the scanning positions of the first and second electron beams Bm1 and Bm2 which then are supplied to a memory 13. In the memory 13 are written in advance the compensating signals $S_{CH}$ and $S_{CV}$ corresponding to the scanning positions of the first and second electron beams Bm1 and Bm2 which then are read out in turn therefrom on the basis of the address signals. The read-out compensating signals $S_{CH}$ and $S_{CV}$ are latched by a latch circuit 14 and then converted to the form of analog signals by a D/A (digital-to-analog) converter 15, which then are supplied through low pass filters 16H, 16V and amplifiers 17H, 17V to horizontal convergence yoke 4 and vertical convergence yoke 5.

Depending on the designing of the cathode ray tube, the above D.C. currents $S_{DV}$ and $S_{DH}$ may not be always required. For example, if the first and second cathodes K1 and K2 are disposed in parallel to each other in the horizontal direction and the first and second electron beams Bm1 and Bm2 emanated therefrom impinge upon, for example, the center of the fluorescent screen 3 at the same position relative to the horizontal direction, the D.C. current $S_{DH}$ is not necessary. On the other hand, if, for example, the cathodes K1 and K2 are disposed in parallel to each other in the vertical direction and the first and second electron beams Bm1 and Bm2 impinge upon, for example, the center of the fluorescent screen 3 at the same position relative to the horizontal direction, and with approximately ½ line interval apart from each other in the vertical direction, the D.C. currents $S_{DH}$ and $S_{DV}$ are not necessary.

The cathode ray tubes 1R, 1G and 1B are each constructed as described above. Thus, the first and second electron beams Bm1 and Bm2 emanated from the first and second cathodes K1 and K2 simultaneously scan the fluorescent screen with approximately ½ line interval apart from each other in the vertical direction.

In this embodiment, the same red primary color signal R, green primary color signal G and blue primary color signal B are respectively supplied to the first and second cathodes K1 and K2 in the respective cathode ray tubes 1R, 1G and 1B which then are driven thereby.

Turning back to FIG. 7, reference numeral 18 designates an antenna, 19 a tuner, 20 an intermediate frequency amplifier and 21 a video detecting circuit. The video signal $S_V$ derived from the video detecting circuit 21 is supplied to a luminance signal/chrominance signal separating circuit 22. The luminance signal Y derived from this separating circuit 22 is supplied to a matrix circuit 23, while the chrominance signal C derived from the separating circuit 22 is supplied to a color demodulating circuit 24. From the color demodulating circuit 24 are derived, for example, a red color-difference signal R-Y and a blue color-difference signal B-Y which then are supplied to the matrix circuit 23, respectively. The matrix circuit 23 generates the red primary color signal R, the green primary color signal G and the blue primary color signal B, respectively. The red primary color signal R is supplied through a gain adjusting circuit $25R_1$ to an adder $26R_1$ to which a predetermined voltage $E_{R1}$ is supplied. Thus, in the adder $26R_1$, this predetermined voltage $E_{R1}$ is added to the red primary color signal R which is then fed to the first cathode K1 in the cathode ray tube 1R. The red primary color signal R is also supplied through a gain adjusting circuit $25R_2$ to an adder $26R_2$ to which a predetermined voltage $E_{R2}$ is supplied. Thus, in the adder $26_{R2}$, the predetermined voltage $E_{R2}$ is added to the red primary color signal R which is further supplied to the second cathode K2 in the cathode ray tube 1R. In this case, if the gains are adjusted by the gain adjusting circuits $25R_1$ and $25R_2$ and the values of the voltages $E_{R1}$ and $E_{R2}$ are changed to thereby perform the cut-off adjustment, the intensities of the first and second beams Bm1 and Bm2 emanated from the first and second cathodes K1 and K2 are made the same.

Similarly, the green primary color signal G is supplied through a gain adjusting circuit $25G_1$ to an adder $26G_1$ to which a predetermined voltage $E_{G1}$ is supplied. Thus, in the adder $26G_1$, this predetermined voltage $E_{G1}$ is added to the green primary color signal G which is then supplied to the first cathode K1 in the cathode ray tube 1G. On the other hand, the green primary color signal G is supplied through a gain adjusting circuit $25G_2$ to an adder $26G_2$ to which a predetermined voltage $E_{G2}$ is supplied. Thus, in the adder $26G_2$, the predetermined voltage $E_{G2}$ is added to the green primary color signal G which is then supplied to the second cathode K2 in the cathode ray tube 1G. Also in this case, if the gains are adjusted by the gain adjusting circuits $25G_1$ and $25G_2$ and the values of the voltages $E_{G1}$ and $E_{G2}$ are changed to thereby perform the cutoff adjustment, the first and second beams Bm1 and Bm2 emanated from the first and second cathodes K1 and K2 become the same in intensity.

Similarly, the blue primary color signal B is supplied through a gain adjusting circuit $25B_1$ to an adder $26B_1$ to which a predetermined voltage $E_{B1}$ is supplied. Thus, in the adder $26B_1$, the predetermined voltage $E_{B1}$ is added to the blue primary color signal B which is then supplied to the first cathode K1 in the cathode ray tube 1B. On the other hand, the blue primary color signal B is supplied through a gain adjusting circuit $25B_2$ to an adder $26B_2$ to which a predetermined voltage $E_{B2}$ is applied. Thus, in the adder $26B_2$, this predetermined voltage $E_{B2}$ is added to the blue primary color signal B which is then supplied to the second cathode K2 in the cathode ray tube 1B. Also in this case, if the gains are adjusted by the gain adjusting circuits $25B_1$ and $25B_2$ and the values of the voltages $E_{B1}$ and $E_{B2}$ are changed to thereby carry out the cut-off adjustment, the first and second electron beams Bm1 and Bm2 emanated from the first and second cathodes K1 and K2 are made the same in intensity.

In FIG. 7, the video signal $S_V$ derived from the video detecting circuit 21 is further supplied to a synchronizing separating circuit 27. The vertical synchronizing Signal $V_{sync}$ and the horizontal synchronizing signal $H_{sync}$ derived from the separating circuit 27 are respectively supplied to a vertical deflecting circuit 28V and a horizontal deflecting circuit 28H. From these deflecting circuits 28V and 28H are supplied deflecting signals $S_{VD}$ and $S_{HD}$ to deflection coils 29 in the cathode ray tubes 1R, 1G and 1B.

The synchronizing signals $V_{sync}$ and $H_{sync}$ from the separating circuit 27 are both supplied to a convergence circuit 30. In the convergence circuit 30, the D.C. current $S_{DV}$ and the compensating signal $S_{CV}$ which are supplied, for example, to the coil 4c in the vertical convergence yoke 4 as described above are formed and the D.C. current $S_{DH}$ and compensating current $S_{CH}$ which are supplied to the coil 5e in the horizontal convergence yoke 5 are formed, respectively. These currents are formed differently so as to correspond to these cathode ray tubes 1R, 1G and 1B, respectively. These signals are supplied to each of the coils 4c and 5e which are included in the convergence yokes 4 and 5 in each of the cathode ray tubes 1R, 1G and 1B.

The cathode ray tube according to this embodiment is constructed as described above. Therefore, the same red primary color signal R is supplied to the first and second cathodes K1 and K2 of the cathode ray tube 1R which then are driven. Thus, the first and second electron beams Bm1 and Bm2 emanated from the first and second cathodes K1 and K2 scan simultaneously the fluorescent screen with approximately ½ line interval apart from each other in the vertical direction. Accordingly, by the one-beam system cathode ray tube with 525 scanning lines, only 262.5 scanning lines emit lights or the visual displays are formed on only 262.5 scanning lines within one field, while in the cathode ray tube according to this embodiment, the remaining 262.5 scanning lines emit light simultaneously or the visual displays are formed on the remaining 262.5 lines inherently relating to the succeeding field within the same one field so that the visual displays are formed on all of 525 lines during one field. Thus, the red picture image $S_R$ is displayed on the picture screen as described above.

Similarly, the green picture image $S_G$ and the blue picture image $S_B$ are displayed on the picture screens of the cathode ray tubes 1G and 1B, respectively.

According to this embodiment of the present invention, since the red picture image $S_R$, the green picture image $S_G$ and the blue picture image $S_B$ are displayed on the picture screens of the cathode ray tubes 1R, 1G and 1B by lighting all the scanning lines thereof within one field, the display period of each scanning line becomes, for example 1/60 second so that the flicker of the scanning line is not perceived on each of the picture images $S_R$, $S_G$ and $S_B$. Moreover, since the cathode ray tube according to this embodiment does not employ the electron beam which is formed longer in the longitudinal direction unlike the prior art, the vertical resolution is much less deteriorated. As a result, according to this embodiment, a color picture image of excellent picture quality can be displayed on a screen (not shown).

In the above embodiment, the scanning positions of the first and second electron beams Bm1 and Bm2 are controlled by means which uses the magnetic vertical convergence yoke 5 and horizontal convergence yoke 4 or the twist coil 7. The control means for such purpose is not limited to the above but the following version is possible. Namely, by way of example, horizontal and vertical compensating plates are disposed in the directions perpendicular to each other within the cathode ray tube, and control voltages are applied to the compensating plates, so that the scanning positions of the first and second electron beams Bm1 and Bm2 are controlled electrostatically.

In the embodiment in FIG. 7 in which the same signal is supplied to the first and second cathodes K1 and K2 in each of the cathode ray tubes 1R, 1G and 1B to thereby operate the same, when any movement appears in the picture, there may occur such a case that a stepwise distortion, namely, so-called "zig-zag" display becomes conspicuous in the slant line portion thereof so that the visual sense is damaged.

The reason why the above mentioned "zig-zag" display becomes conspicuous will be described as follows.

Figure 19:
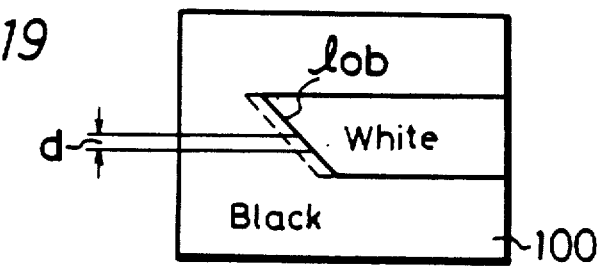
FIG. 19 and FIGS. 20A to 20F are respectively diagrams useful for explaining a so-called "zig-zag" display.
Figure 20A:
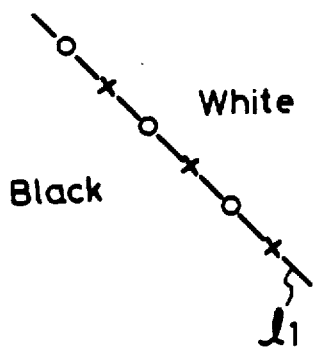
Figure 20B:
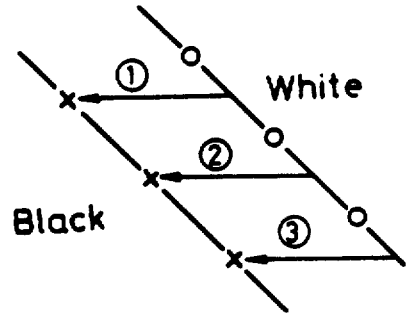

Let us now consider a picture screen 100 on which a picture image having a slant line portion lob as shown in FIG. 19 is displayed. Then, let it be assumed that when this picture image is animated, it is displayed as shown by the solid line in the first field, while it is displayed as shown by the broken line in the second field. The above reason will hereinafter be described with reference to an example in which a part d of the slant line portion lob in this picture image is enlarged. When the picture image is not animated in the case of normal interlacing, the part d becomes as shown in FIG. 20A. In FIGS. 20A to 20F, each circle mark ○ represents a boundary between black and white colors of the scanning line during the first field, while each cross mark x represents a boundary between black and white colors of the scanning line during the second field. In this case, the boundary between the black and white colors of the picture is perceived as shown by a solid line $l_1$. When the picture is animated in the case of normal interlacing, the slant line portion becomes as shown in FIG. 20B. In this case, the change from the first field to the second field is perceived by, for example, arrows ①, ② and ③. And, in this case, since the lengths of the arrows ①, ② ③ are equal, "zig-zag" display is never perceived.

In like manner, let us consider the case of the cathode ray tube of 2-beam system in the embodiment of FIG. 7 and in which the first and second cathodes K1 and K2 emitting the first and second electron beams Bm1 and Bm2 are supplied with the same signal.

Figure 20C:
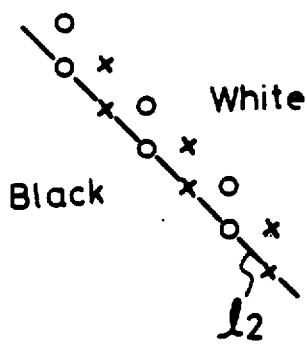
Figure 20D:
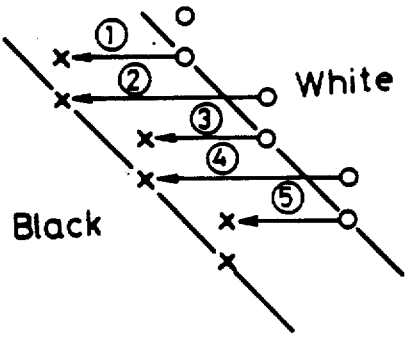

When the picture is not animated, and the slant line portion becomes as shown in FIG. 20C. In the figure, circle marks ○ and cross marks x which are formed, for example, at the upper side are formed by the first electron beam Bm1, while those at the lower side are formed by the second electron beam Bm2. In this case, the boundary between the white and black colors is perceived as shown by a solid line $l_2$. When the picture image is animated, the slant line portion becomes as shown in FIG. 20D. In this case, the change from the first field to the second field is perceived by, for example, arrows ①, ②, ③, ④ and ⑤. In this case, the lengths of the arrows ①, ③ and ⑤ become shorter than those of the arrows ② and ④ so that the change on each scanning line is not made uniform. Thus, at this time, "zig-zag" display is perceived.

Figure 21:
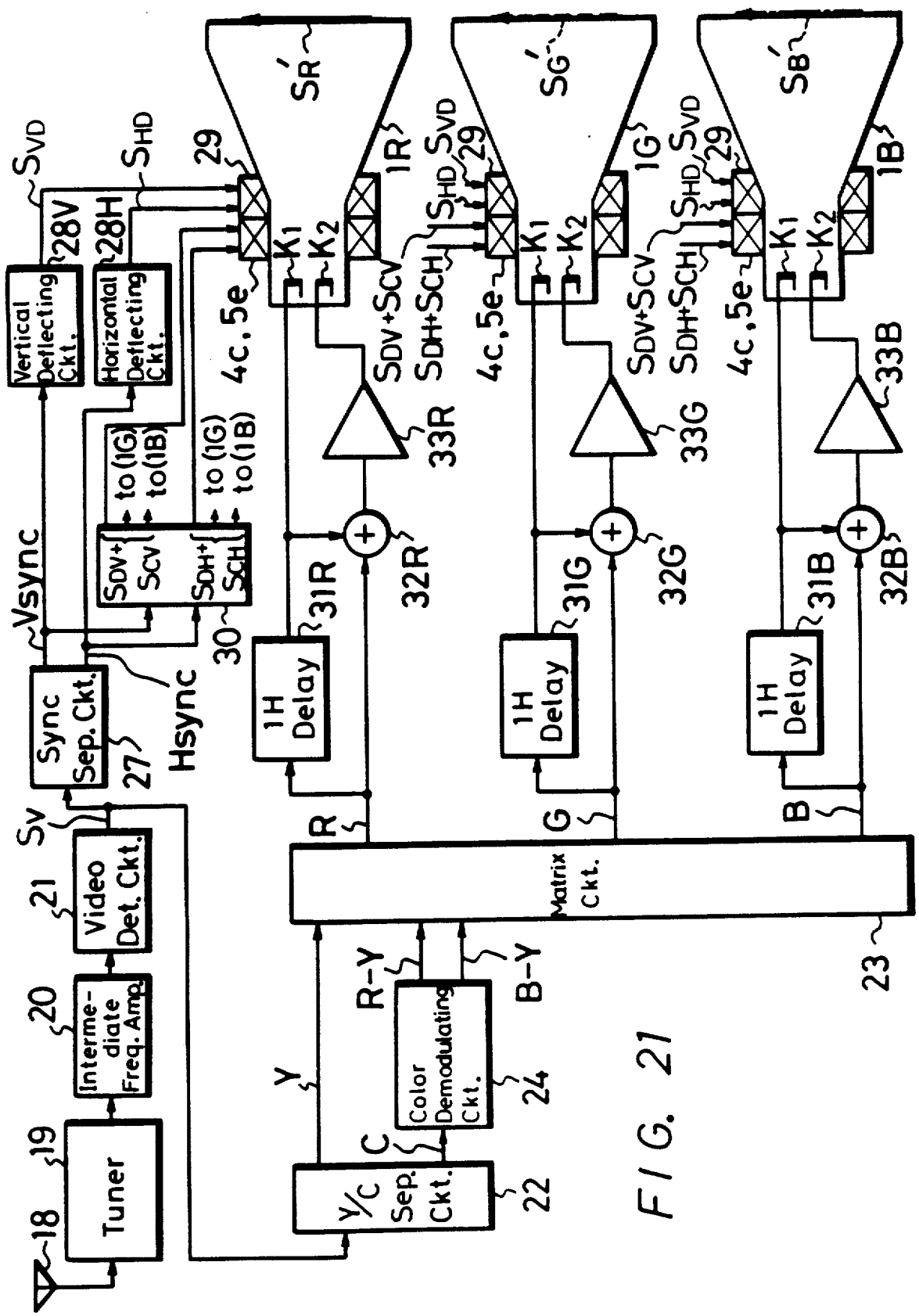
FIG. 21 is a schematic diagram showing another embodiment of the television receiver according to the present invention.

Now, an improved second embodiment of the present invention will hereinafter be described with reference to FIG. 21. In FIG. 21, like parts corresponding to those of FIG. 7 are marked with the same references and will not be described in detail.

In the embodiment of FIG. 21, the red primary color signal R derived from the matrix circuit 23 is supplied through a delay line 31R having a delay amount of one horizontal period (1H) to an adder 32R and to the first cathode K1 in the cathode ray tube 1R. Also the red primary color signal R is directly supplied to the adder 32R. The added signal from this adder 32R is adjusted to have ½ level by a level adjuster 33R and then supplied to the second cathode K2 in the cathode ray tube 1R. In this case, the signal which is supplied to the first cathode K1 in the cathode ray tube 1R is the red primary color signal R derived from one scanning line (the line prior to the present scanning line), while to the second cathode K2 is supplied a signal formed by adding and averaging the red primary color signal R from one scanning line and a red primary color signal R from the succeeding scanning line (the present scanning line).

The green primary color signal G and the blue primary color signal B are similarly supplied to the first and second cathodes K1 and K2 in each of the cathode ray tubes 1G and 1B. In FIG. 21, reference numerals 31G and 31B respectively designate delay lines, each of which has a delay amount of 1H, 32G and 32B designate adders and 33G and 33B designate level adjusters which adjust or reduce to one-half the level of the signal from adder 32G or 32B, respectively.

The second embodiment of FIG. 21 is otherwise constructed similar to that shown in FIG. 7. According to the second embodiment constructed as above, the red primary color signal R from one scanning line is supplied to the first cathode K1 in the cathode ray tube 1R, while the signal formed by adding and averaging the red primary color signal R from the one scanning line and the red primary color signal R from the succeeding scanning line is supplied to the second cathode K2, whereby the cathode ray tube 1R is driven. By the first and second electron beams Bm1 and Bm2 emanated from the first and second cathodes K1 and K2, similarly to the embodiment shown in FIG. 7, all the scanning lines are lighted during each field and thus the red picture image $S_R'$ is displayed on the picture screen.

Similarly, the green picture images $S'_G$ and the blue picture image $S'_B$ are respectively displayed on the picture screens of the cathode ray tubes 1G and 1B.

Here, "zig-zag" display in the second embodiment will be taken into consideration.

Figure 20E:
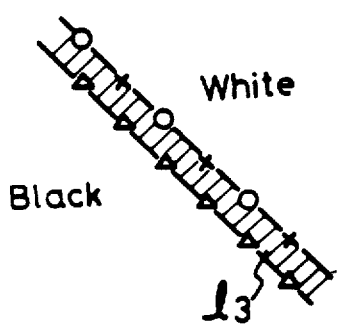
Figure 20F:
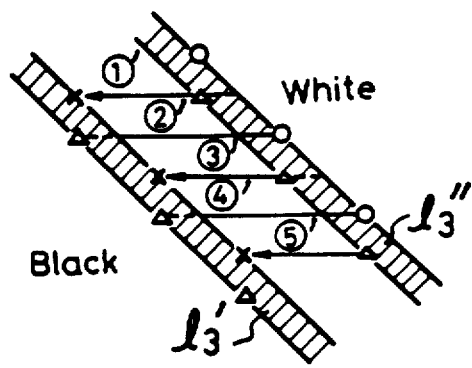

With the cathode ray tube constructed according to this embodiment, when the picture image is not animated, the slant line portion thereof becomes as shown in FIG. 20E. In the figure, triangle mark Δ represents a dot formed by, for example, the second electron beam Bm2 and this dot has a brightness intermediate between black and white colors, namely, grey. The hatched area $l_3$ is an area which is perceived as grey. In this case, the boundary between the black and white colors of the picture image is perceived as this grey area $l_3$. When the picture image is animated, the slant line portion becomes as shown in FIG. 20F. In this case, the change from the first field to the second field is indicated by, for example, arrows ①', ②', ③', ④' and ⑤' and the lengths of the arrows ①', ③' and ⑤' are shorter than those of the arrows ②' and ④'. However, by reason of grey areas $l'_3$ and $l''_3$ shown by hatched areas on FIG. 20F, the arrows ①', ③' and ⑤' are perceived as longer than the arrows ①, ③ and ⑤ in FIG. 20D (in the embodiment in FIG. 7), while the arrows ②' and ④' are perceived as shorter than the arrows ② and and ④ in FIG. 20D. In consequence, the changes in the respective scanning lines are not readily perceived so that "zig-zag" display can be alleviated.

According to the second embodiment of the present invention, since the primary color signal of one scanning line is supplied to the first cathodes K1 in each of the cathode ray tubes 1R, 1G and 1B, which the signal which is provided by adding and averaging the primary color signal from the one scanning line and the primary color signal from the succeeding scanning line is supplied to the second cathode K2 of each of the cathode ray tubes 1R, 1G and 1B to thereby drive the cathode ray tubes, the change from the first field to the second field is perceived not so different on each scanning line and thus "zig-zag" display is alleviated.

Figure 22:
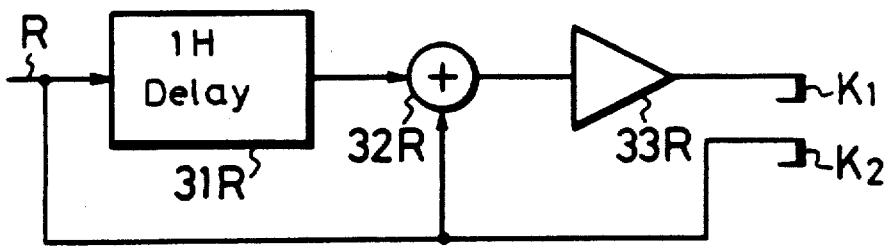
FIGS. 22 to 24 are respectively diagrams showing a further embodiments of the television receiver according to the present invention.

It is also possible that, as shown in FIG. 22, the primary color signal from one scanning line (the present scanning line) is supplied to the second cathode K2, while the signal which is provided by adding and averaging the primary color signal from the one scanning line and the primary color signal from the preceding scanning line (the scanning line which precedes the present scanning line) is supplied to the first cathode K1. At any rate, it is necessary that the primary color signal which has substantial components delayed in time is applied to the first cathode K1, that is, to the cathode which emits the first electron beam Bm1 which scans the upper scanning line. While only a part corresponding to the cathode ray tube 1R is shown in FIG. 22, a part corresponding to each of the cathode ray tubes 1G and 1B is constructed in the same manner.

Figure 23:
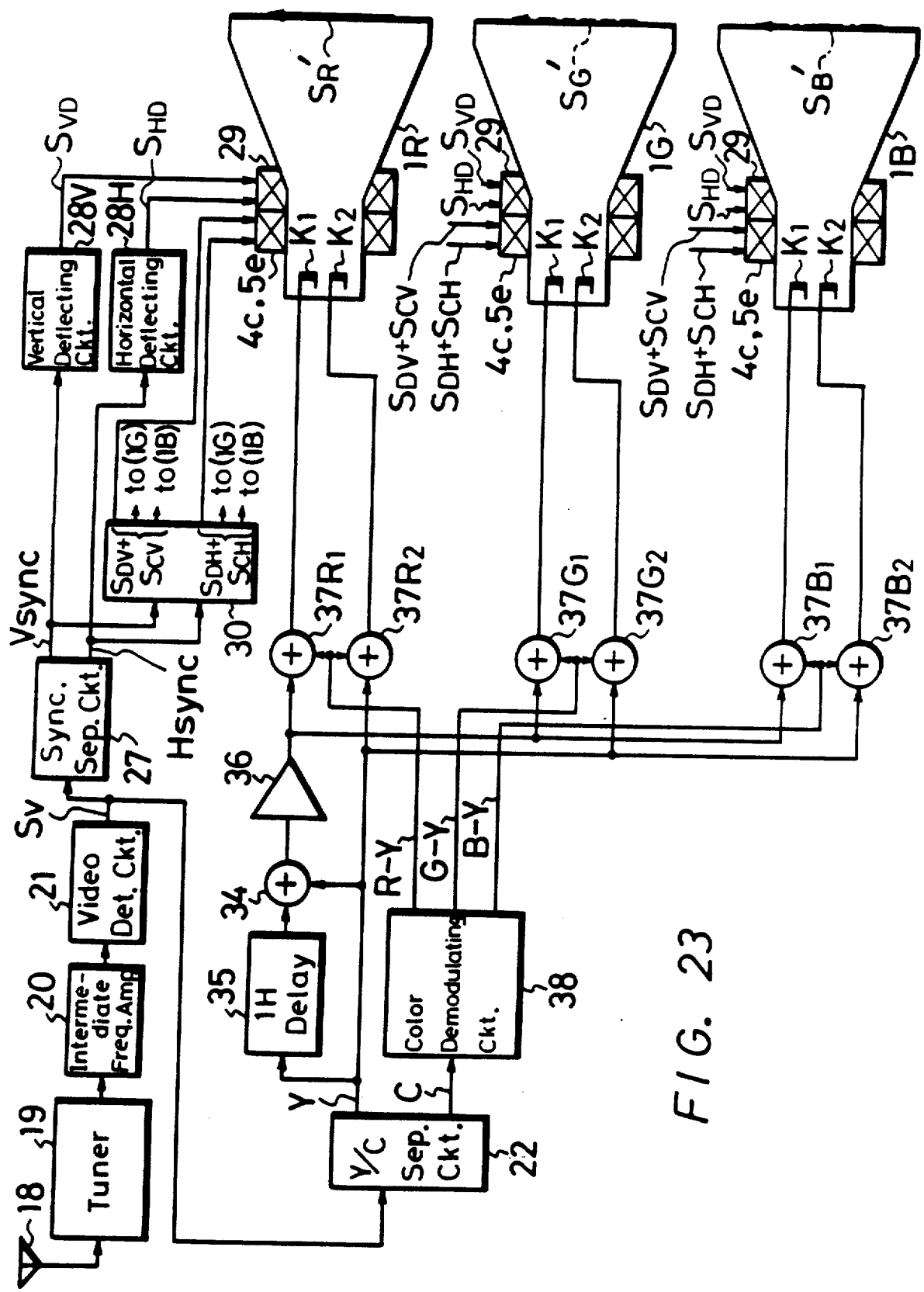

FIG. 23 schematically shows a further embodiment of the present invention. In FIG. 23, like parts corresponding to those in FIG. 21 are marked with the same references and will not be described in detail.

In the embodiment shown in FIG. 23, a signal provided by adding a luminance signal component and a color-difference signal component of the signal from one scanning line (the signal from the present scanning line) is supplied to the second cathodes K2 of each of the cathode ray tubes 1R, 1G and 1B, while a signal, which is formed by adding and averaging the luminance signal component from the signal of the one scanning line and the luminance signal component of the signal from the preceding scanning line (the signal from the scanning line preceding the present scanning line) and by adding and averaging the former and the color-difference signal component of the signal from the one scanning line is supplied to the first cathodes K1.

In FIG. 23, the luminance signal Y separated by the luminance signal/chrominance signal separating circuit 22 is supplied to an adder 34 and also supplied through a delay line 35 having a delay amount of 1H to the adder 34. The added signal from this adder 34 is adjusted to have ½ its original level by a level adjuster 36 and then supplied to adders $37R_1$, $37G_1$ and $37B_1$. The luminance signal Y separated by the separating circuit 22 is also supplied to adders $37R_2$, $37G_2$ and $37B_2$.

The chrominance signal C separated by the separating circuit 22 is supplied to a color demodulating circuit 38. From the color demodulating circuit 38 are respectively derived a red color-difference signal R-Y, a green color-difference signal G-Y and a blue color-difference signal B-Y. The red color-difference signal R-Y is supplied to the adders $37R_1$ and $37R_2$. The added signals from the adders $37R_1$ and $37R_2$ are respectively supplied to the first and second cathodes K1 and K2 of the cathode ray tube 1R. The green color-difference signal G-Y from the color demodulating circuit 38 is supplied to the adders $37G_1$ and $37G_2$. The added signals from the adders $37G_1$ and $37G_2$ are respectively supplied to the first and second cathodes K1 and K2 of the cathode ray tube 1G. Further, the blue color-difference signal B-Y from the color demodulating circuit 38 is supplied to the adders $37B_1$ and $37B_2$. The added signals from the adders $37B_1$ and $37B_2$ are respectively supplied to the first and second cathodes K1 and K2 of the cathode ray tube 1B.

The remainder of the embodiment shown in FIG. 23 is constructed the same as the embodiment shown in FIG. 21.

Accordingly, as mentioned above, the signal formed by adding the luminance signal component of the signal from one scanning line and the color-difference signal component is supplied to the second cathodes K2 of the cathode ray tubes 1R, 1G and 1B, while the signal provided by adding and averaging the luminance signal component of the signal from one scanning line and the luminance signal component from the signal from the preceding scanning line and by adding the former to the color-difference signal component of the signal from the one scanning line is supplied to the first cathodes K1 thereof.

According to the embodiment shown in FIG. 23, the luminance signal component is relatively delayed in the same way as the color signals are relatively delayed in the embodiment shown in FIG. 21, while the same chrominance signal component is supplied to the first and second cathodes K1 and K2 in FIG. 23. The chrominance signal component, however, has the narrow band region inherently, so that it does not affect the occurrence of "zig-zag" display. Thus, the same action and effect as the embodiment shown in FIG. 21 can be achieved. Further, according to the embodiment shown in FIG. 23, the circuit requires only one signal delay line 35, bringing about an advantage that the circuit construction can be considerably simplified.

In the embodiment shown in FIG. 23, while the color-difference signal components supplied to the first and second cathodes K1 and K2 are derived from the signal of one scanning line, they may be derived from the signal of the scanning line preceding the present scanning line.

Figure 24:
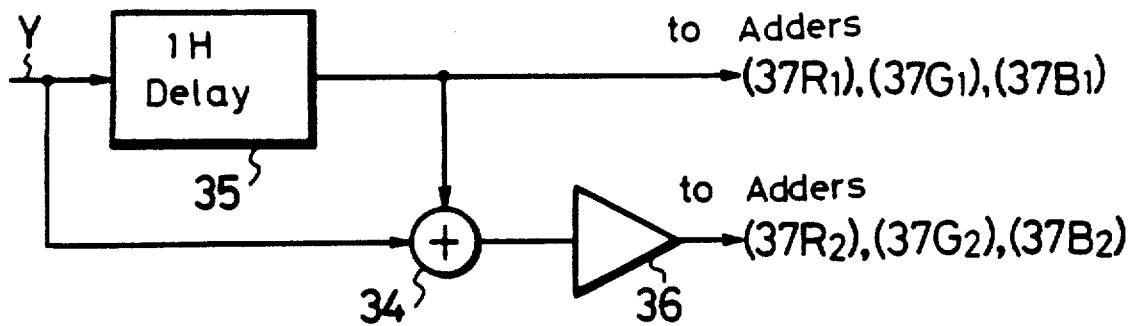

Uplike the embodiment shown in FIG. 23, such a version is also possible that as shown in FIG. 24, the luminance signal component of the signal from one scanning line (the signal of the scanning line preceding the present scanning line) is supplied to the first cathodes K1 of the cathode ray tubes 1R, 1G and 1B, while the signal provided by adding and averaging the luminance signal component from the one scanning line and the luminance signal component from the succeeding scanning line (the signal from the present scanning line) is supplied to the second cathodes K2 thereof. Also in the embodiment shown in FIG. 24, as the color-difference signal component supplied to the first and second cathodes K1 and K2, there can be used a color-difference signal component derived from the one scanning line signal or the succeeding scanning line signal.

As set forth above, in a television receiver according to the present invention, during one field, of a received television signal intended for interlaced display, the scanning lines which will be lighted inherently during the next field are lighted by the scanning of the second electron beam so that all the scanning lines can be lighted during one field. Thus, the display period of each scanning line becomes, for example, 1/60 second and therefore no flicker from the scanning line is perceived on the picture image to be displayed. In addition, according to the present invention, since the electron beam is not formed longer in the longitudinal direction, the deterioration of resolution is never caused.

Furthermore, according to the improved embodiments of the present invention, since the other cathode is supplied with the signal which is provided by adding and averaging one scanning line signal and the preceding or succeeding scanning line signal, even in the slant line portion of an animation, the change from the first field to the second field is not perceived too differently for the two lines scanned simultaneously and thus "zig-zag" display can be alleviated.

The above description refers to preferred embodiments of the invention, but it will be apparent that many modifications and variations could be effected by one skilled in the art without departing from the spirit or scope of the novel concepts of the invention, so that the scope of the invention should be determined by the appended claims only.

We claim as our invention:

1. A television receiver for providing a non-interlaced display of a received television signal intended for interlaced display comprising:
    a cathode ray tube having first and second cathodes, control grids and a fluorescent screen;
    means responsive to the received television signal for applying a first video signal to said first cathode such that said first cathode emits a first electron beam in response to said first video signal;
    means responsive to said first video signal for applying to said second cathode a second video signal determined at least in part by said first video signal such that said second cathode emits a second electron beam in response to said second video signal simultaneously with the emanation of said first electron beam from said first cathode;
    deflection means for horizontally and vertically deflecting said first and second electron beams from said first and second cathodes simultaneously so that each of said beams scans said screen along a respective pattern of vertically spaced, substantially horizontal scanning lines; and
    deflection compensating means provided between said first and second cathodes and said fluorescent screen for making said second electron beam impinge upon said fluorescent screen between said scanning lines of said first electron beam such that said second electron beam forms a visual display spaced $\frac{1}{2}$ line interval apart from a visual display simultaneously formed by said first electron beam.

2. A television receiver according to claim 1, wherein said deflection compensating means is formed as magnetic convergence means.

3. A television receiver according to claim 1, wherein said deflection compensating means is formed as electrostatic convergence means.

4. A television receiver according to claim 1, wherein said second video signal is identical with said first video signal.

5. A television receiver according to claim 1, wherein said video signal is formed by averaging instantaneous values of said first video signal occurring at corresponding positions in two successive lines thereof.

6. A television receiver according to claim 5, wherein each of said first and second video signal is formed by adding a luminance component and a color-difference component, the luminance component of said second video signal is formed by averaging instantaneous values of the luminance component of said first video signal occurring at corresponding positions in two successive lines thereof, and the color-difference component of said second video signal being applied to said second cathode is identical with the color-difference component of said first video signal being simultaneously applied to said first cathode.

7. A television receiver of a video projector type for providing a non-interlaced display of a received television signal intended for interlaced display, comprising:
    a plurality of monochrome cathode ray tubes corresponding to respective primary color components of an input video signal, each of said cathode ray tubes having first and second cathodes, control grids and a fluorescent screen for emitting light of the corresponding primary color;
    means responsive to the received television signal for applying a set of first primary color signals to the corresponding first cathodes of said plurality of monochrome cathode ray tubes, respectively, such that each of said first cathodes emits a first electron beam in response to the corresponding one of said set of first primary color signals;

means responsive to said set of first primary color signals for applying to the corresponding second cathodes of said plurality of monochrome cathode ray tubes, respectively, a set of second primary color signals determined at least in part by said first primary color signals such that each of said second cathodes emits a second electron beam in response to the corresponding one of said set of second primary color signals simultaneously with the emanation of said first electron beam from the respective first cathode;

deflection means for horizontally and vertically deflecting the electron beams from said first and second cathodes simultaneously in each of said cathode ray tubes so that each of said beams scans said screen along a respective pattern of vertically spaced, substantially horizontal scanning lines; and deflection compensating means provided between said first and second cathodes and said fluorescent screen in each of said cathode ray tubes for making said second electron beam impinge upon said fluorescent screen between said scanning lines of said first electron beam such that said second electron beam forms a visual display spaced ½ line interval apart from a visual display simultaneously formed by said first electron beam.

8. A television receiver of a video projector type according to claim 7, wherein said set of second primary color signals is identical with said set of first primary color signals.

9. A television receiver of a video projector type according to claim 7, wherein said set of second primary color signals is formed by averaging instantaneous values of said set of first primary color signals occurring at corresponding positions in two successive lines thereof.

10. A television receiver of a video projector type according to claim 7, wherein said set of first primary color signals is formed by adding a first common luminance component and respective color-difference components, said set of second primary color signals is formed by adding a second common luminance component and respective color-difference components, said second common luminance component of said set of second primary color signals is formed by averaging instantaneous values of said first common luminance component of said set of first primary color signals occurring at corresponding positions in two successive lines thereof, and said color-difference components of said set of second primary color signals being applied to said second cathodes are identical with respective color-difference components of said set of first primary color signals being simultaneously applied to said first cathodes.

* * * * *

UNITED STATES PATENT AND TRADEMARK OFFICE
CERTIFICATE OF CORRECTION

PATENT NO. : 4,954,901

DATED : September 4, 1990

INVENTOR(S) : Okada, et al

It is certified that error appears in the above-identified patent and that said Letters Patent is hereby corrected as shown below:

The title page should be deleted to appear as per attached title page.

Figure 1:
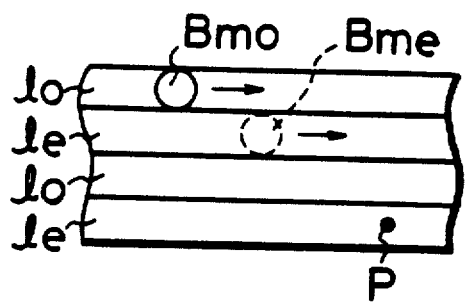
FIGS. 1 to 6 are respectively diagrams useful for explaining a conventional television receiver.

The sheets of Drawings consisting of Figs. 1 thur 24 should be added as per attached sheet.

Signed and Sealed this

Twenty-first Day of April, 1992

Attest:

HARRY F. MANBECK, JR.

*Attesting Officer*         *Commissioner of Patents and Trademarks*

United States Patent [19]

Okada et al.

[11] Patent Number: 4,954,901
[45] Date of Patent: Sep. 4, 1990

[54] TELEVISION RECEIVER WITH TWO ELECTRON BEAMS SIMULTANEOUSLY SCANNING ALONG RESPECTIVE VERTICALY SPACED APART LINES

[75] Inventors: Takashi Okada, Kanagawa; Atsushi Matsuzaki, Yokohama, both of Japan

[73] Assignee: Sony Corporation, Tokyo, Japan

[21] Appl. No.: 579,561

[22] Filed: Feb. 13, 1984

[30] Foreign Application Priority Data

Feb. 15, 1983 [JP] Japan ................... 58-23168
Feb. 16, 1983 [JP] Japan ................... 58-23998

[51] Int. Cl.⁵ .................. H04N 5/68; H04N 9/20
[52] U.S. Cl. .................. 358/242; 315/13.1; 358/65; 358/140
[58] Field of Search .......... 358/64, 65, 242, 140; 313/409, 413; 315/13.1

[56] References Cited

U.S. PATENT DOCUMENTS

| | | | |
|---|---|---|---|
| 2,855,542 | 10/1958 | Schade | 315/13.1 |
| 3,363,129 | 1/1968 | De France et al. | 358/65 |
| 3,411,029 | 11/1968 | Karr | 313/409 |
| 3,513,350 | 5/1970 | Ohgoshi et al. | 315/13.1 |
| 4,400,722 | 8/1983 | Miyatake et al. | 358/60 |
| 4,415,931 | 11/1983 | Dischert | 358/242 |
| 4,521,802 | 6/1985 | Ikeda | 358/140 |
| 4,604,547 | 8/1986 | Saito et al. | 313/413 |
| 4,668,977 | 5/1987 | Ohno et al. | 358/60 |

FOREIGN PATENT DOCUMENTS

| | | | |
|---|---|---|---|
| 145428 | 11/1979 | Japan | 358/21 V |
| 27755 | 2/1980 | Japan | 315/13.1 |
| 206034 | 12/1983 | Japan | |
| 223992 | 12/1983 | Japan | |
| 1064346 | 12/1983 | U.S.S.R. | |
| 1424031 | 2/1976 | United Kingdom | |

OTHER PUBLICATIONS

Liff, Alvin A., *Color and Black & White Television Theory and Servicing*, Second Edition, Prentice-Hall, date unknown, p. 40.

*Primary Examiner*—James J. Groody
*Attorney, Agent, or Firm*—Alvin Sinderbrand

[57] ABSTRACT

A television receiver for providing a non-interlaced display of a received television signal intended for interlaced display includes a cathode ray tube having first and second cathodes, control grids and a fluorescent screen, a circuit for applying a first video signal to the first cathode such that the first cathode emanates a first electron beam in response to the first video signal, a circuit for applying a second video signal to the second cathode such that the second cathode emanates a second electron beam in response to the second video signal, a deflection device for horizontally and vertically deflecting the first and second electron beams from the first and second cathodes simultaneously and a deflection compensating device provided between the first and second cathodes and the fluorescent screen for making the second electron beam impinge upon the fluorescent screen between the lines scanned by the first electron beam such that the second electron beam forms a visual display with lines ½ line interval apart, in the vertical direction, from a visual display formed by the first electron beam. The first and second video signals fed to the first and second cathodes are the same in one embodiment. In other embodiments, the video signals fed to the two cathodes in one line may be the video signal for that one line and the average of the video signal for that one line and the video signal for the preceding or succeeding line, respectively.

10 claims, 11 Drawings

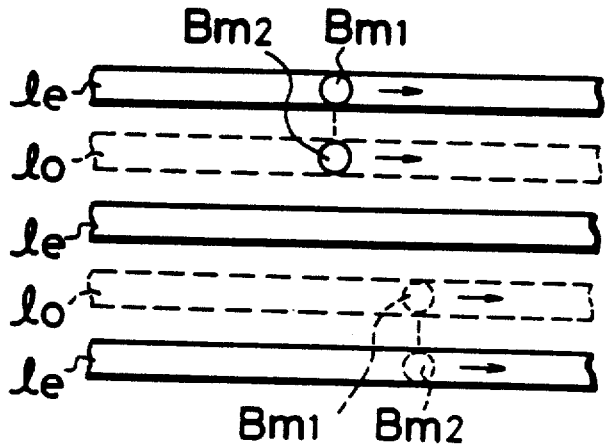

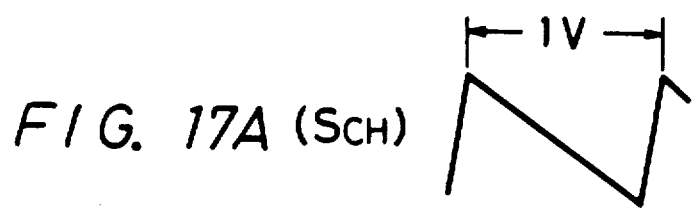
FIG. 17A (SCH)
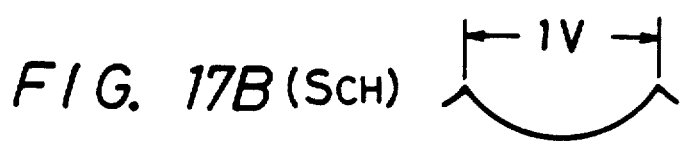
FIG. 17B (SCH)
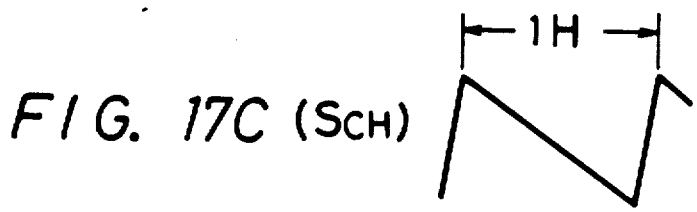
FIG. 17C (SCH)
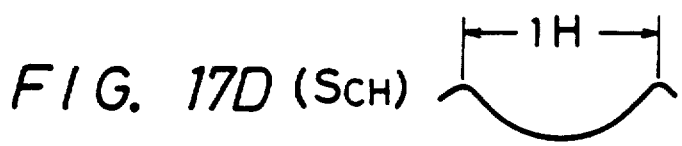
FIG. 17D (SCH)
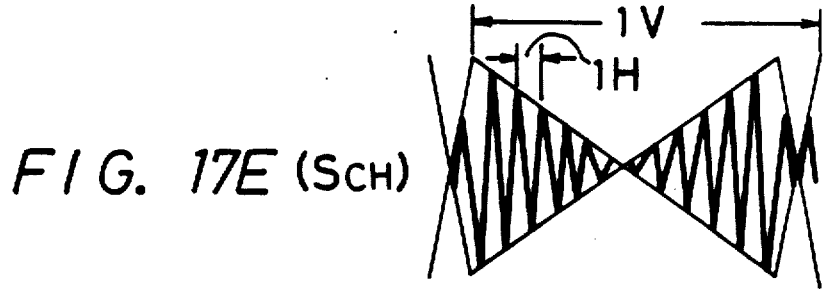
FIG. 17E (SCH)
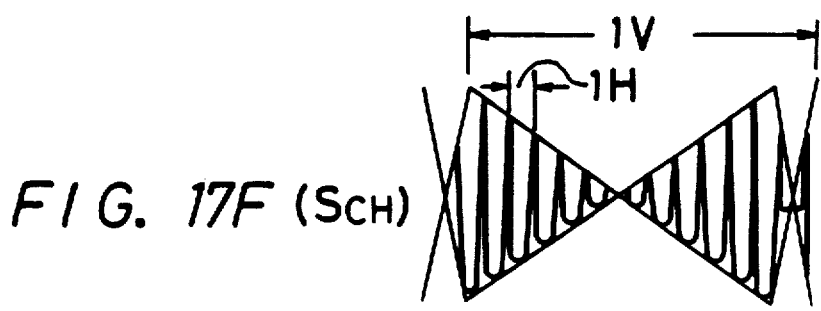
FIG. 17F (SCH)